United States Patent
Spivey (10) Patent No.: US 7,372,646 B2
(45) Date of Patent: *May 13, 2008

(54) ADJUSTABLE FOCUS LENS SYSTEM

(76) Inventor: Brett Spivey, 7435 Neptune Dr., Carlsbad, CA (US) 92009

( * ) Notice: Subject to any disclaimer, the term of this patent is extended or adjusted under 35 U.S.C. 154(b) by 0 days.

This patent is subject to a terminal disclaimer.

(21) Appl. No.: 11/085,436

(22) Filed: Mar. 21, 2005

(65) Prior Publication Data

US 2006/0209430 A1    Sep. 21, 2006

(51) Int. Cl.
G02B 7/02 (2006.01)
G02C 5/00 (2006.01)

(52) U.S. Cl. .......................................... 359/815; 351/41

(58) Field of Classification Search ............... 359/793, 359/811, 813–815, 823–824; 351/41, 158
See application file for complete search history.

(56) References Cited

U.S. PATENT DOCUMENTS

| | | | |
|---|---|---|---|
| 1,948,636 A | 2/1934 | Tillyer | |
| 3,507,565 A | 4/1970 | Alvarez | |
| 3,617,116 A | 11/1971 | Jones | |
| 5,076,665 A * | 12/1991 | Petersen | 359/811 |
| 5,347,400 A * | 9/1994 | Hunter | 359/815 |
| 6,208,464 B1 * | 3/2001 | Tsukamoto et al. | 359/557 |

* cited by examiner

Primary Examiner—Alicia M Harrington
(74) Attorney, Agent, or Firm—John R. Ross; John R. Ross, III (57) ABSTRACT

An adjustable focus lens system with at least two lens units and a mechanism to adjust the position of at least one of the two lens units relative to the other in a direction generally perpendicular to a viewing direction. The first of the two lens units has a specially designed surface and the second of the two lens units has a surface that is substantially complementary to the surface of the first lens unit. In preferred embodiments a first adjustable focus lens system with two lens units is mounted in a frame along with a second similar adjustable focus lens system to provide a pair of eyeglasses with adjustable focus.

6 Claims, 5 Drawing Sheets

ADJUSTABLE FOCUS LENS SYSTEM

This invention relates to adjustable focus lenses and in particular to eyeglasses with adjustable focus lenses.

BACKGROUND OF THE INVENTION

Thin Lenses

In ophthalmology and optometry it is customary to specify the focal length of spectacle lenses in diopters. The power P of any lens in diopters D is defined as the reciprocal of the focal length f in meters (i. e., P=1/f). For thin lenses, the power P of a two lens ($P_1$ and $P_2$) stacked combination is the sum of the power of the two lenses (i. e., $P=P_1+P_2$). Stacking of two thin lenses 1 and 2 where $P_1=-P_2$ would produce a power of zero, equivalent to a flat plate. The two lenses do not perfectly cancel, but as long as the power is fairly weak (i.e., less than about 5 diopters), the human eye does not detect the residual aberration.

The Human Eye

The adjustable lens of the human eye, called the "crystalline lens", is located immediately behind the iris. The crystalline lens is comprised of 4 layers, from the surface to the center: the capsule, the sub-capsular epithelium, the cortex and the nucleus. The lens capsule is a clear, membrane-like structure that is quite elastic, a quality that keeps it under constant tension. As a result, the lens naturally tends toward a rounder or more globular configuration, a shape it must assume for the eye to focus at a near distance. Slender but very strong suspending ligaments, which attach at one end to the lens capsule and at the other end to protrusions of the circular ciliary body around the inside of the eye, hold the lens in place. When the ciliary body relaxes, the protrusions pull on the suspending ligaments, which in turn pull on the lens capsule around its equator. This causes the entire lens to flatten or to become less convex, enabling the lens to focus light from objects at a far away distance. Likewise when the ciliary muscle contracts, tension is released on the suspending ligaments, and on the lens capsule, causing both lens surfaces to become more convex again and the eye to be able to refocus on near objects. This adjustment in lens shape, to focus at various distances, is referred to as "accommodation". The "amplitude of accommodation" of an eye is the maximum amount that the eye's crystalline lens can accommodate. This amount is very high when young and decreases with age.

The cornea of the human eye is also important in providing focus. In fact, the cornea provides by far the greatest optical power in the eye, with a power of 43.0 D. The entire optical system of the eye has a power of 58.6 D. This causes the light entering the eye to focus onto the retina. The power of the cornea can not be adjusted, except by surgery.

Presbyopia

After age 40 in most people (and by age 45 in virtually all people) a clear, comfortable focus at a near distance becomes more difficult with eyes that see clearly at a far distance. This normal condition is known as "presbyopia", and is due both to a lessening of flexibility of the crystalline lens and to a generalized weakening of the ciliary muscle. By the time one reaches 65 or so, the crystalline lens is virtually incapable of changing shape. Unless one is nearsighted, it is not possible to focus objects (such as a printed page) clearly at even an arm's length distance. The amount of presbyopia inevitably increases with age. Eyeglasses are usually used to provide correct focus as needed. These eyeglasses include bifocal, trifocal, and continuous focal glasses. Other solutions include separate glasses for distance and reading.

Attempts have been made to design glasses providing adjustable focus. Suggested techniques include: (1) pumping a clear fluid between thin lenses that bulge with increasing pressure (U.S. Pat. No. 2,567,581), (2) use of voltage controlled liquid crystal nematic material to change refractive indexes (U.S. Pat. No. 5,359,444) and (3) use of a variety of pixilated electro-active materials (U.S. Pat. No. 6,733,130). These prior art patents are incorporated herein by reference. These prior art patents disclose techniques for finding automatic focus settings for these glasses. These techniques include range finders and small camera viewing of both eyes to detect distances being observed. These prior art patents also describe small processors and drivers to control focus based on estimates of the distances.

Bifocals, trifocal and continuous focus glasses all have their problems as is well known by the people who wear them, and the automatic focus glasses have not been successful in solving the problems. What is needed is a better technique for solving problems of human eye focus including the problems associated with presbyopia that we will all encounter, if we live long enough.

SUMMARY OF THE INVENTION

The present invention provides an adjustable focus lens system with at least two lens units. A mechanism is provided to adjust the position of a first lens unit relative to a second lens unit in a direction generally perpendicular to a viewing direction. The first of the two lens units has a specially designed surface and the second of the two lens units has a surface that is substantially complementary to the specially designed surface of the first lens unit. In preferred embodiments, two lens systems, each having two lens units, are mounted in a frame to provide eyeglasses with adjustable focus. The designs of the specially designed surfaces are chosen such that small adjustments of the relative positions of the two lens units, in each lens system, in directions predominantly perpendicular to the viewing direction results in changes in the combined focus of the two lens units in each of the two lens systems. In a preferred embodiment the specially designed surface of the first lens unit of each lens system is described by:

$$Z(X,Y)=C_1*(X^3/3+XY^2)+C_2,$$

where $C_1$ and $C_2$ are constants. And the specially designed surface of the second lens unit of each lens system is described by:

$$Z_C(X,Y)=-C_1*(X^3/3+XY^2)+C_2.$$

When the two lens units are stacked, as long as the thickness variations are small the effective thickness of both lens units is equal to:

$$Z(X,Y)+Z_C(X,Y)=2*C_2,$$

which is the expression for a flat plate. If the location of $Z_c$ in the x direction is changed by a small amount, dx, then the thickness variations do not cancel anymore, and the net thickness is:

$$Z(X,Y)+Z_C(X+dx,Y)=2*C_2+-C_1*(dx*(X^2+Y^2)+dx^2*X+dx^3/3).$$

This is the expression for a powered optic, either a focusing or diverging lens, depending on the sign of $C_1$.

Various techniques for providing the lateral adjustment are disclosed. A simple technique is a thumbscrew adjustment that is operated by the wearer. Another is finger force against a friction force between one of the lenses and the frame of the glasses. A small two- or three-position lever adjustment can also be operated manually. Automatic focusing techniques are also disclosed.

DETAILED DESCRIPTION OF PREFERRED EMBODIMENTS

Theory

Consider a first lens with a surface described by:

$$Z(X,Y) = C_1 * (X^3/3 + XY^2) + C_2,$$

where $C_1$ and $C_2$ are constants. Consider a second lens with a surface described by:

$$Z_c(X,Y) = -C_1 * (X^3/3 + XY^2) + C_2.$$

When the two lenses are stacked, as long as the thickness variations are small the effective thickness of both lenses is equal to:

$$Z(X,Y) + Z_c(X,Y) = 2*C_2,$$

which is the expression for a flat plate. If the location of $Z_c$ in the x direction is changed by a small amount dx, then the thickness variations do not cancel anymore, and the net thickness is:

$$Z(X,Y) + Z_c(X+dx,Y) = 2*C_2 - C_1*(dx*(X^2+Y^2) + dx^2*X + dx^3/3).$$

This is the expression for a powered optic, either a focusing or diverging lens, depending on the sign of $C_1$. The second to the last term creates a slight shift in the image position but does not change the focusing properties of the optic. The complicated third order shapes mostly cancel, as they did when the lenses were exactly lined up, leaving a variable focal length lens that is focused by an amount proportional to the lateral displacement of the first lens with respect to the second lens.

Prototype Embodiment

Figure 1:
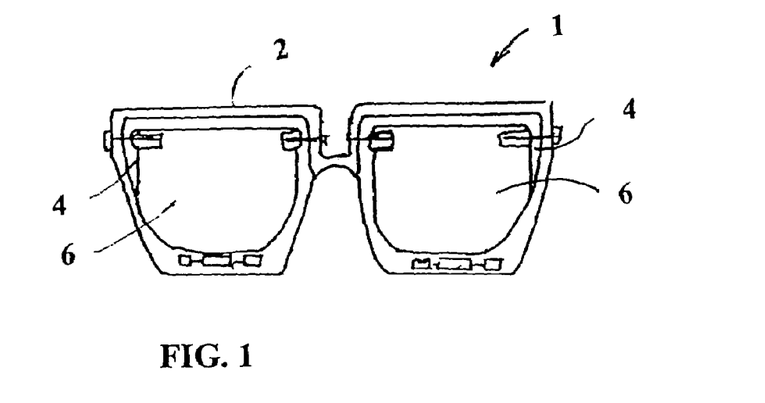
FIG. 1 is a drawing of a prototype set of eyeglasses based on the present invention.
Figure 2:
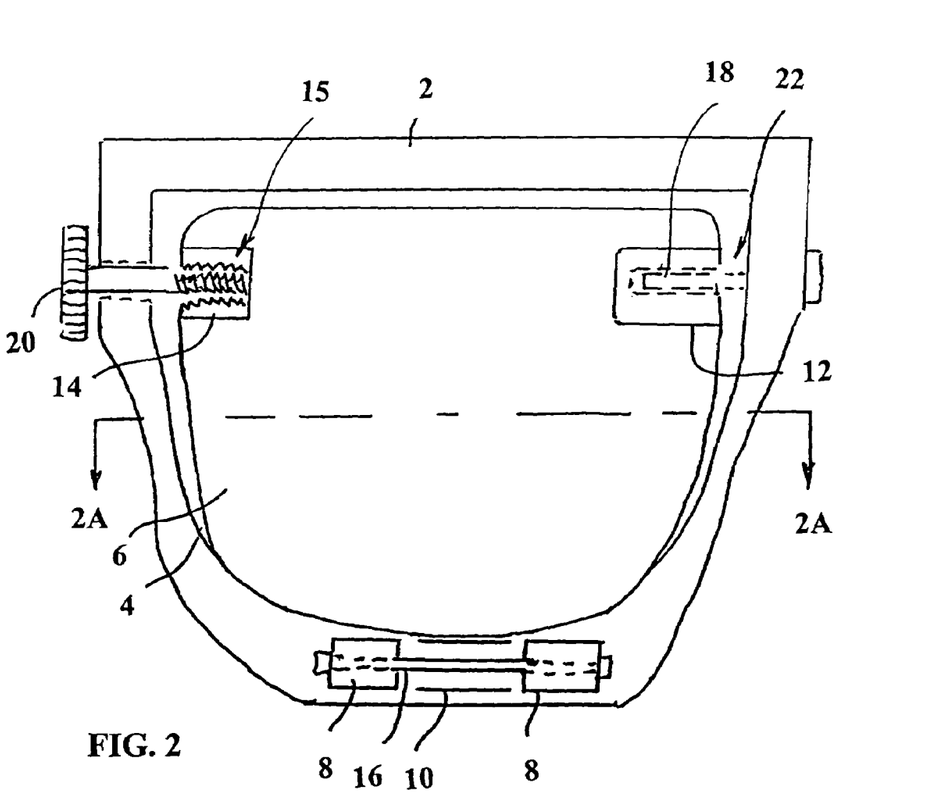
FIG. 2 is a larger view of one of the lenses of the eyeglasses shown in FIG. 1.

A prototype version of the present invention is shown at 1 in FIG. 1. This is a drawing of a pair of eyeglasses with wearer operated focusing lenses. This embodiment includes metal or plastic frame 2, two back lenses 4 and two front lenses 6. Back lenses 4 are mounted rigidly on frame 2. A more detailed version of each lens pair is shown in FIG. 2. Front lenses 6 are mounted so that they can be moved laterally with respect to back lenses 4. Two pen mounts 8 are attached rigidly to frame 2 and tabs 10, 12 and 14 are attached rigidly to front lenses 6. Pen 16 passes through pen mounts 8, allowing it to slide through tab 10. Pen 18 passes through frame 2, allowing it to slide through tab 12. Adjustment screw 20 passes through frame 2 and screws into treaded socket 15 in tab 14. Spring 22 between frame 2 and tab 12 provides a compressive force in the direction of adjustment screw 20. The wearer of the glasses shown in FIG. 1 adjusts the focus of each of the lenses by rotating adjustment screws 20 as shown in FIG. 2.

Figures 2A, 2B:
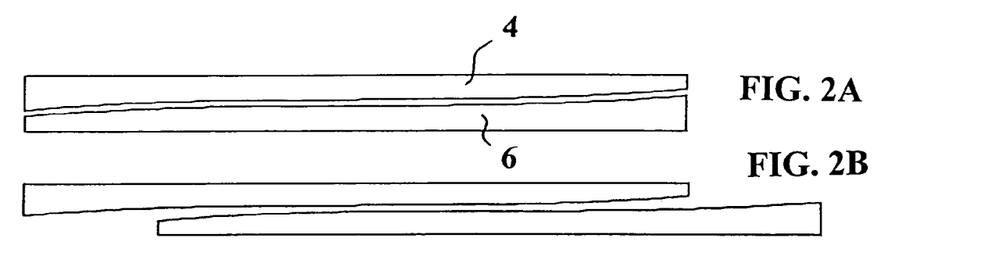
FIGS. 2A through 2D and 3A and B compare a lens system with single-lens units with a system with one of the lens units being a two-lens unit.
Figure 3A:
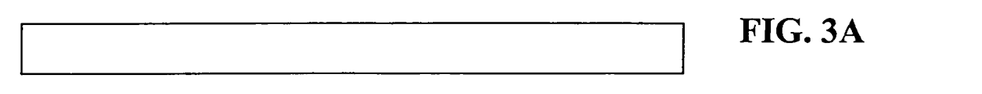
Figure 3B:
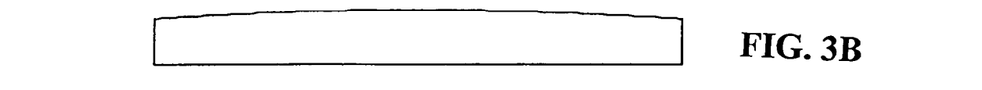

FIG. 2A shows a cross section view (cut in the horizontal plane) through back lens 4 and front lens 6 showing the relative vertical positions of the two lenses. Note that the curvature of lens 6 is the complement of the curvature of lens 4. The effect of this pair of lenses is approximately equivalent to a flat plate shown in FIG. 3A. In FIG. 2B lens 6 is offset to the right by 20 percent of the lens width. The net result of the offset is to produce the equivalent of a convex surface as shown in FIG. 3B, to bring the wearer's focal point nearer to him as compared to its uncorrected location. The reader will appreciate that if lens 6 is moved farther to the left with respect to lens 4, a concave surface will be the effective result, thus moving the wearer's focal point farther away as compared to the location of his uncorrected focal point.

Specific Example

Applicant has performed ray trace calculations of the sliding lens system to verify that the optical quality is sufficient for eyewear. As an example calculation, Applicant used a pair of optics with one flat surface and one cubic surface. The flat surfaces are on the outside and the cubic surfaces are facing each other such that there is a 0.1 mm gap between the optics when in the null position, with the effect of the cubic surfaces nearly canceling each other out. The optics are assumed to be made of a typical glass with index of refraction of 1.5. The strength of the cubic surface is described by:

$$Z = \frac{1}{60 \text{ cm}^2}\left(\frac{x^3}{3} + xy^2\right)$$

Figures 4, 5, 6:
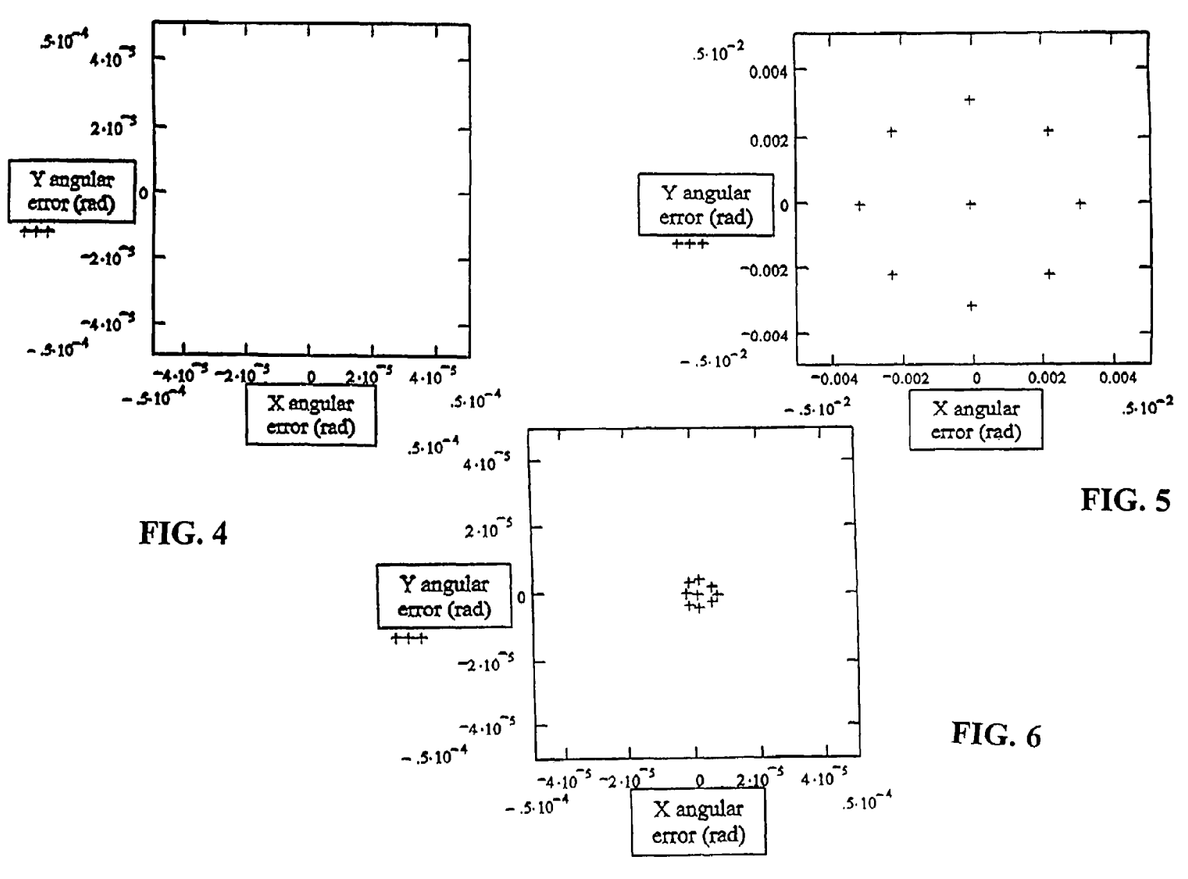
FIGS. 4, 5 and 6 are plots of results of ray trace calculations.

The eye was modeled as having pupil diameter of 4 mm, with the pair of optics placed 2 cm in front of the eye. The eye is pointed to look at an object directly in front of the subject, with the center of the eye 3 cm from the centerline of the subject. The eyeball diameter was assumed to be 4 cm. The rays originate at the eye and travel to a plane at various distances from the eye, which demonstrates the pattern that the eye senses at the object. In FIGS. 4, 5 and 6 Applicant has plotted these patterns divided by the distance so that the errors are represented as angles.

The eye is first pointed at an object 10 meters away, with the eyeball properly focused at this 10-m focal length. This weak focusing at 10 meters is very close to an infinite focal length. The lenses are in the aligned position, with 0.1-mm gap. The resulting pattern at the object is shown FIG. 4. Plotted is the angular position of nine rays. They are packed so closely in the center that the positions cannot be distinguished. The scale of the outer box is the approximate diffraction resolution limit for the eye—approximately 0.1 milliradian. The small pattern compared to this dimension indicates that the level of aberration will not be noticeable.

Next, Applicant moves the object plane in to 60 cm and re-points the eye, but does not refocus the eye. He first calculates the resulting angular pattern without readjusting the optics, and gets the pattern shown in FIG. 5. The angular scale on this plot is 100 times larger than the previous plot, and it can be seen that the lack of proper focus greatly degrades the eye's limiting resolution, which is 1/100 of the total box size. Then, to refocus the glasses-eye optical system, he slides the lens 6 laterally in the plus x direction a distance of 1.012 cm. (This could be accomplished in the FIG. 2 example by rotating adjustment screw 20.) The resulting ray angular locations at 60 cm are shown in FIG. 6. Here Applicant has plotted the data on the original scale, for which the outer box size is the limiting resolution. The much smaller spot cluster indicates that the level of aberration will not be noticeable, and that the lenses have properly refocused the glasses-eye system.

Moving only lens 6 (relative to lens 4 and the eye of the patient) requires a slight repointing of the eye. In order to preserve the eye's pointing direction, he would need to slide the first lens 7.2 mm in the x direction, and slide the second lens 2.92 mm in the minus x direction opposite from the first lens, for a net off-set of 1.012 cm. The reader will understand that providing adjustments for both lenses adds some complication to the design shown in FIGS. 1 and 2, but could be done by, for example, using another adjustment screw.

Techniques for Use

This simple preferred embodiment of the present invention provides important improvements over prior art glasses such as bifocals, trifocals and continuous focal lenses. The lenses can each be adjusted by the user so that his viewed object is exactly in focus through all portions of the two lenses. This is especially advantageous if the viewed object is stationary with respect to the wearer such as when reading, working at the computer, watching TV and watching a movie. This particular embodiment does not provide for very quick adjustment of the focus. This could be somewhat of a problem in situations, for example, when a student is watching a lecturer and taking notes at the same time. A simple solution in these situations, however, would be for the wearer to adjust one lens to focus on the lecturer and the other lens to focus on his notes. His brain will then take over and in each case produce images using data from the in-focus eye.

Vertical Movement to Adjust Focus

Figure 7:
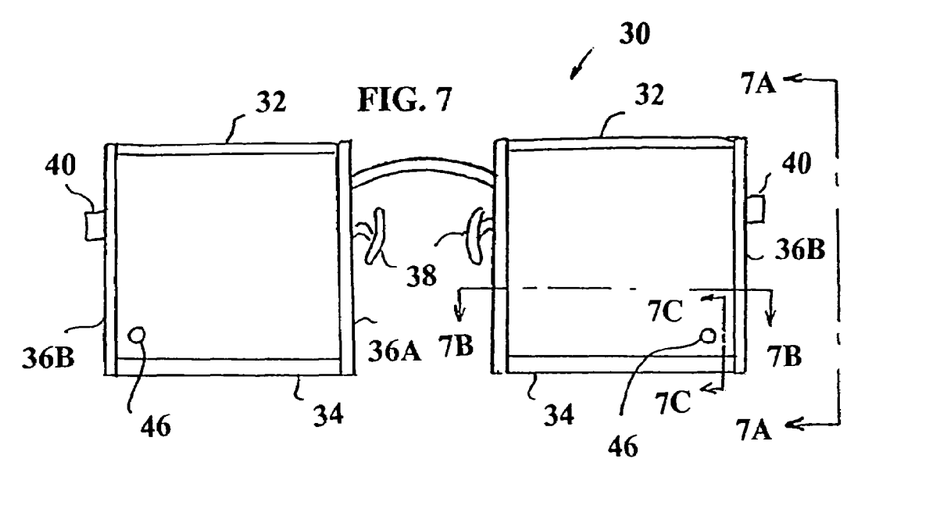
FIGS. 7, 7A, &B and 7C show features of a preferred embodiment where the lenses are moved vertically to adjust focus.
Figure 7A:
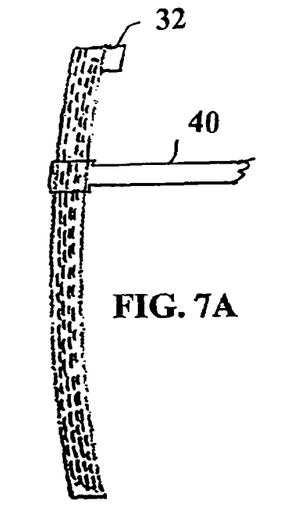

There are some significant advantages of using vertical adjustment of the two lenses relative to each other to provide focus changes. The principles described above for horizontal adjustment apply equally well for the vertical adjustment, by interpreting x as the vertical direction and y as the horizontal direction. Features of a set of glasses designed for vertical adjustment are shown in FIGS. 7, 7A, 7B and 7C. A sketch of a set of glasses is shown in FIG. 7. The two generally cylindrical shell lenses, back lens 42 and front lens 44, for each eye are held in a frame with top frame element 32, side elements 36A and 36B and bottom frame elements 34. The glasses include nosepieces 38 and ear elements 40. In this embodiment the two lenses have a cylindrical shape (with radii of about 5 inches) and the special surfaces for focus adjustment are applied to the inside surfaces in both cases.

Figure 7B:
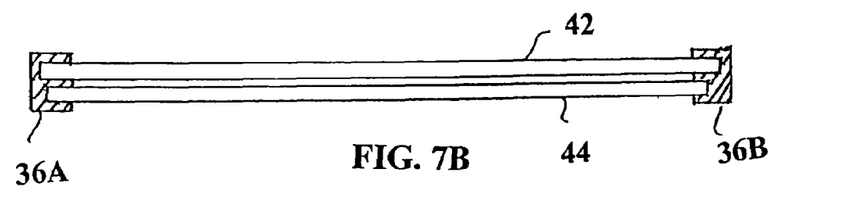
Figure 7C:
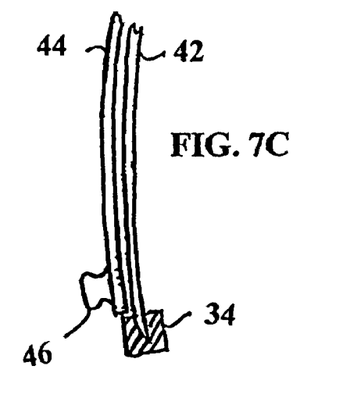

In this embodiment back lens 42 is fixed to the frame but front lens 44 is free to slide up and down in slots in frame elements 36A and 36B as shown in FIG. 7B. The slots in the frame elements 36A and 36B and lens 44 have the same radii of curvature. A tight fit is provided so that sliding occurs only when significant finger force is applied to lens 44. A tab 46 may be provided at the bottom corner of the lenses for applying this force to change the focus.

Automatic Adjustments of Focus

Several prior art patents have proposed techniques for automatic adjustments of the focus of eyeglass lenses. These techniques attempt to determine the distance to the viewed object and then automatically adjust the focus of the lenses in the eyeglasses based on stored information so that the object is in focus for the wearer. These techniques include range finders and small camera viewing both eyes to detect distances between the pupils and small processors and drivers to calculate distances and control focus based on the calculated distances. Cues from the wearer can also be used as a signal to provide an automatic adjustment of the focus. For example, a wink of only the right eye could be a cue to increase the length of focus and a wink of only the left eye could be a cue to decrease it. Additional equipment would have to be added to the basic embodiment described above. Needed would be a motor and actuator with a power source to provide the lateral displacement provided in the example by adjustment screw 20. A small processor could be used to translate cues provided by the range finder, camera or wearer into instructions for the motor and actuator. Specific equipment of this general type for determining distances to viewed objects is described in the patents referenced in the background section.

As an example, a system can be used to measure interpupillary distance. This system would provide a determination of the distance of the object that the eyes are pointed at. If an object is far away, each eye is pointed in approximately the same direction. As the object moves closer, the eyes start to cross so that both are pointed at the object. Small cameras can take digital images of each of the eyes and a miniature digital processor can compute the offset distance that maximizes the correlation of the two images. This offset, when added to the camera separation, yields interpupillary distance. This interpupillary distance can be converted by the same digital processor into a range to the object, which is then converted to an offset distance for the sliding lenses. The processor then commands the motor/actuator to position the lenses in the proper position.

Techniques for Improving Profile

The reader should note that if the polynomial surface includes certain other terms, then the basic functionality is preserved, and is substantially equivalent. In particular, if we select the direction of relative motion to be the X-direction, then any polynomial of degree less than 3 can be added and any function of Y but not X can be added. If:

$$Z(X,Y) = C_1*(X^3/3 + XY^2) + C_2 + C_3*X^2 + C_4*XY + C_5*Y^2 + C_6*X + C_7*Y + C_8 + C_9*F(Y)$$

and $$Z_e(X,Y) = -C_1*(X^3/330\ XY^2) + C_2 - C_3*X^2 - C_4*XY - C_5*Y^2 - C_6*X - C_7*Y - C_8 - C_9*F(Y)$$

then $$Z(X,Y)+Z_c(X+dx,Y)=2*C_2+-C_1*(dx*(X^2+Y^2)+dx^2*X+dx^3/3)-C_3*(2*dx*X+dx^2)-C_4*dx*Y-C_6*dx$$

The result consists of the terms from before (first line) plus new terms (second line). The new terms have a component proportional to X, which results in an angular displacement of the image in the X-direction; a component proportional to Y, which results in an angular displacement in the Y-direction; and 2 terms with neither X nor Y which only result in a change in total thickness but do not noticeably affect the combined lens behavior. These new terms, while possibly causing a displacement in the image, do not change the power in diopters of the lens pair as the lenses are relatively displaced.

It may be desirable to add these additional terms in order to: 1) affect the displacement, and 2) to affect the profile of the lenses, for example to make the lenses more uniform in thickness or easier to manufacture. As an example of adding a term to make the lenses more uniform in thickness, consider the following examples, where we examine the cross section of the lens through the Y=0 slice.

Figure 8A:
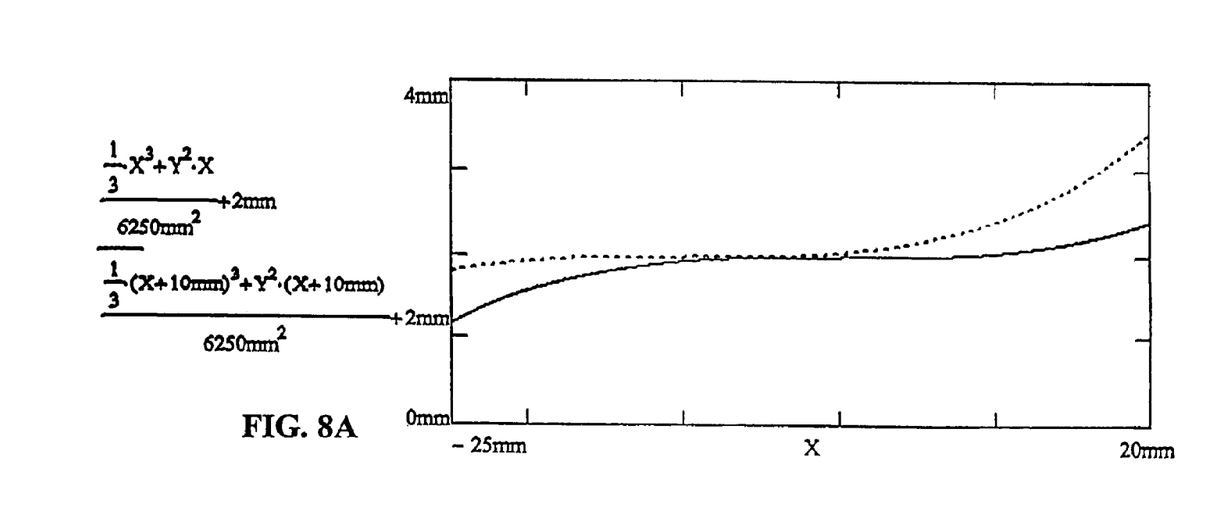
FIGS. 8A and 8B describe a technique for improving the profile of the lenses.

The plot shown in FIG. 8A is of the surface $Z=(X^3/3+XY^2)/(6250 \text{ mm}^2)+2 \text{ mm}$, a typical lens design, through the slice Y=0 (solid line). Also plotted is the complementary surface (dotted line), displaced by 10 mm in the x direction, a typical displacement. Note that the vertical Z scale is greatly exaggerated compared to the horizontal scale. Between the two surfaces is an air gap.

Figure 8B:
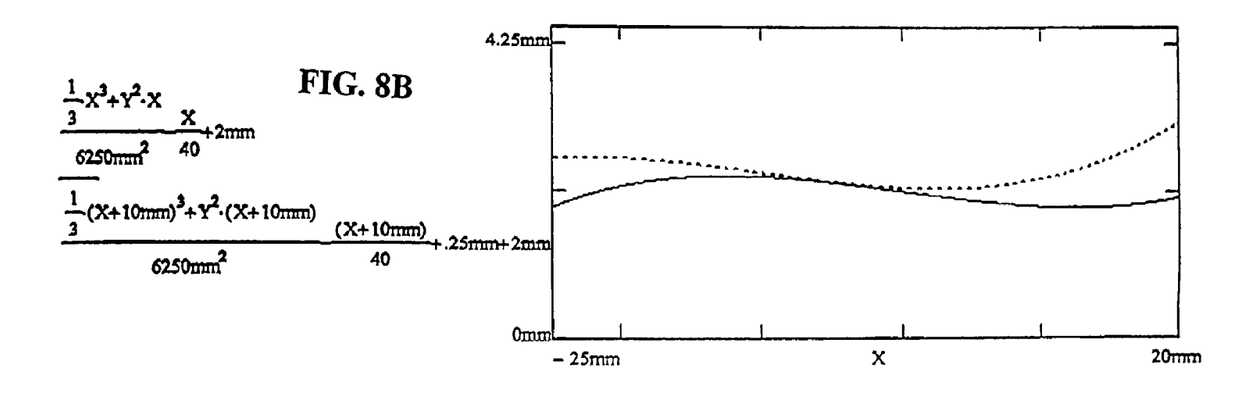

The plot shown in FIG. 8B adds the term X/40 to the surface function. In order for the lenses to not bump, the upper lens now must be displaced 10 mm/40 =0.25 mm in the Z-direction as it is moved 10 mm in the X-direction. The performance of the lens pair is unchanged, but notice that the peak to valley displacement of the surfaces are smaller, and therefore the lenses may be easier to manufacture or mount into the glasses.

Variations

There are many variations of the present invention. For example, the surfaces can all have a common curvature term, and the lenses can move along a curved surface as opposed to pure lateral motion. These surfaces can have the same third degree polynomial thickness variation, but on a curved basis. The base shape can be practically any surface, even a prescription shape to correct astigmatism or other similar problems.

Figure 2C:
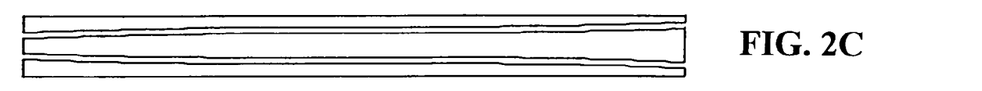
Figure 2D:
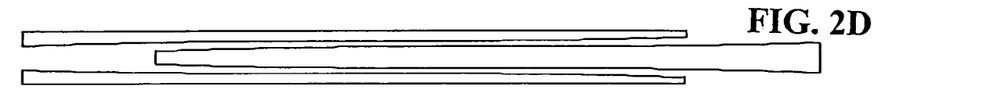

There can be more than two lenses. For example, there could be a pair of stationary lenses on the outside, each with half of one of the thickness functions, with the moving lens with the complement in between. FIGS. 2A through 2D and FIGS. 3A and B provide a comparison between a lens system with single lens units and a system described above with one of the lens units being a pair of stationary lenses with a moving lens in between the pair. FIGS. 2A and 2B represent a lens system with single lens units with FIG. 2A showing the null position and FIG. 2B showing a shifted position. FIGS. 2C and 2D represent a lens system with one of the lens units being comprised of two separated lenses and the other lens unit being a single lens positioned in between the two lens of the first lens unit. FIG. 2C represents the null position and FIG. 2D represents the shifted position. FIG. 3A represents the effective combined total thickness for both null positions (i.e., FIGS. 2A and 2C) and FIG. 3B represents the effective combined total thickness for both shifted positions (i.e., FIGS. 2B and 2D).

The lens can move up and down, side to side, or at any other direction predominately perpendicular to the wearer's line of sight. These movements can include, in addition to predominantly lateral translation, a small amount of translation along the viewing direction and/or a small amount of relative rotation. The moving lenses for each eye can move in common (best for up and down) or in different directions such as out and in away from the nose. Also, both lenses for each eye can move at the same time in opposite directions, as opposed to the first example given where one of the lens is fixed to the eyeglass frame. These special surfaces can be applied to any two of the four surfaces of the two lenses; however, it is better to apply the special surfaces to the inside surfaces as shown in the examples since second order effects depend on distances between the special surfaces.

The present invention can be used for eye examinations. Lateral adjustments can be provided with a micrometer operated by the patient to focus his eyes at various distances and having a read-out on a computer screen indicating lens power needed for focusing at those distances. Such devices might be provided at drug stores selling inexpensive lenses for reading. In addition the lenses might be used to confirm a prescription.

Manufacturing techniques that could be employed include: machining (such as with numerically controlled equipment), molding, special materials with curing and use of gradient index lenses for which thickness is replaced by "optical path length" defined by (n−1)*(thickness) where n is the index of refraction. Potential range finders include optical, laser and acoustic. Cues for automatic changing of focus could include blinking, eyebrow motion and hand switches. Putting a slight curvature (such as spherical, cylindrical or ellipsoidal) on both lenses does not change the power of the lenses and could be incorporated.

In the preferred embodiments and in the claims, surface shapes are sometimes defined with mathematical equations. Minor modifications to the equations can be made without causing variations that could significantly adversely affect the performance of the lens systems. Therefore, in his claims Applicant has used the term "approximately" in connection with these equations with the intention of claiming systems that utilize surfaces that are defined by equations that are not exactly the same as the referenced equations but achieve the same result within the tolerance of the lens system as it is being applied. When applied to eyeglasses the applicable tolerance is the ability of the human eye to detect a difference.

The reader should understand that the present invention is not limited to the specific embodiments described above and that many modifications and additions or deletions could be made to those described embodiments. Therefore, the scope of the invention should be determined by the appended claims and their legal equivalents.

What is claimed is:

1. A pair of eyeglasses comprising:
    (I) a first adjustable focus lens system for adjusting focus in a viewing direction, said adjustable focus lens system comprising:
        A) a first lens unit and a second lens unit, each of said first and second lens units comprising at least one lens with each of the first and second lens units having at least one specially designed surface such that:
            (1) the combined thickness of the at least one lens of the first lens unit is complementary or substantially complementary to the combined thickness of the at least one lens of the second lens unit and
            (2) adjustments of the relative positions of the two said lens units in a direction perpendicular or approximately perpendicular to the viewing direction results in changes in the combined focusing power of the two lens units, and B) a motor driven adjustment mechanism for moving at least one of the lens units relative to the other lens unit in a direction perpendicular or approximately perpendicular to the viewing direction, based on a measured distance to a viewed object, so as to adjust the focusing power of the combined lens units and (II) a second adjustable focus lens system comprising:

A) a first lens unit and a second lens unit, each of said first and second lens units comprising at least one lens with each of the first and second lens units having at least one specially designed surface such that:

(1) the combined thickness of the at least one lens of the first lens unit is complementary or substantially complementary to the combined thickness of the at least one lens of the second lens unit and (2) adjustments of the relative positions of the two said lens units in a direction perpendicular or approximately perpendicular to the viewing direction results in changes in the combined focusing power of the two lens units, and B) a motor driven adjustment mechanism for moving at least one of the lens units relative to the other lens unit in a direction perpendicular or approximately perpendicular to the viewing direction, based on a measured distance to a viewed object, so as to adjust the focusing power of the combined lens units;

(III) a frame in which said first and second lens systems are mounted.

2. An adjustable focus lens system for adjusting focus in a viewing direction, said adjustable focus lens system comprising:

A) a first lens unit and a second lens unit, each of said first and second lens units comprising at least one lens with each of the first and second lens units having at least one specially designed surface such that:

(1) the combined thickness of the at least one lens of the first lens unit is complementary or substantially complementary to the combined thickness of the at least one lens of the second lens unit and (2) adjustments of the relative positions of the two said lens units in a direction perpendicular or approximately perpendicular to the viewing direction results in changes in the combined focusing power of the two lens units, and B) an adjustment mechanism for moving at least one of the lens units relative to the other lens unit in a direction perpendicular or approximately perpendicular to the viewing direction (defining relative motion in lateral translation) so as to adjust the focusing power of the combined lens units;

wherein the relative motion of the said lens units has, in addition to the predominantly lateral translation, a small amount of translation along the viewing direction.

3. An adjustable focus lens system for adjusting focus in a viewing direction, said adjustable focus lens system comprising:

A) a first lens unit and a second lens unit, each of said first and second lens units comprising at least one lens with each of the first and second lens units having at least one specially designed surface such that:

(1) the combined thickness of the at least one lens of the first lens unit is complementary or substantially complementary to the combined thickness of the at least one lens of the second lens unit and (2) adjustments of the relative positions of the two said lens units in a direction perpendicular or approximately perpendicular to the viewing direction results in changes in the combined focusing power of the two lens units, and B) an adjustment mechanism for moving at least one of the lens units relative to the other lens unit in a direction perpendicular or approximately perpendicular to the viewing direction (defining relative motion in lateral translation) so as to adjust the focusing power of the combined lens units;

wherein the relative motion of the said lens units has, in addition to the predominantly lateral translation in a small amount of relative rotation.

4. A pair of eyeglasses comprising:

(I) a first adjustable focus lens system for adjusting focus in a viewing direction, said adjustable focus lens system comprising:

A) a first lens unit and a second lens unit, each of said first and second lens units comprising at least one lens with each of the first and second lens units having at least one specially designed surface such that: (1) the combined thickness of the at least one lens of the first lens unit is complementary or substantially complementary to the combined thickness of the at least one lens of the second lens unit and (2) adjustments of the relative positions of the two said lens units in a direction perpendicular or approximately perpendicular to the viewing direction results in changes in the combined focusing power of the two lens units, and B) a motor driven adjustment mechanism for moving at least one of the lens units relative to the other lens unit in a direction perpendicular or approximately perpendicular to the viewing direction, based on a measurements of the wearer's eye positions, so as to adjust the focusing power of the combined lens units and (II) a second adjustable focus lens system comprising:

A) a first lens unit and a second lens unit, each of said first and second lens units comprising at least one lens with each of the first and second lens units having at least one specially designed surface such that:

(1) the combined thickness of the at least one lens of the first lens unit is complementary or substantially complementary to the combined thickness of the at least one lens of the second lens unit and (2) adjustments of the relative positions of the two said lens units in a direction perpendicular or approximately perpendicular to the viewing direction results in changes in the combined focusing power of the two lens units, and B) a motor driven adjustment mechanism for moving at least one of the lens units relative to the other lens unit in a direction perpendicular or approximately perpendicular to the viewing direction, based on a measurements of the wearer's eye positions, so as to adjust the focusing power of the combined lens units;

(III) a frame in which said first and second lens systems are mounted.

5. A pair of eyeglasses comprising:

(I) a first adjustable focus lens system for adjusting focus in a viewing direction, said adjustable focus lens system comprising:

A) a first lens unit and a second lens unit, each of said first and second lens units comprising at least one lens with each of the first and second lens units having at least one specially designed surface such that:
   (1) the combined thickness of the at least one lens of the first lens unit is complementary or substantially complementary to the combined thickness of the at least one lens of the second lens unit and
   (2) adjustments of the relative positions of the two said lens units in a direction perpendicular or approximately perpendicular to the viewing direction results in changes in the combined focusing power of the two lens units, and
B) a motor driven adjustment mechanism for moving at least one of the lens units relative to the other lens unit in a direction perpendicular or approximately perpendicular to the viewing direction, based on a measurements of the wearer's eye positions, so as to adjust the focusing power of the combined lens units and (II) a second adjustable focus lens system comprising:
   A) a first lens unit and a second lens unit, each of said first and second lens units comprising at least one lens with each of the first and second lens units having at least one specially designed surface such that:
      (1) the combined thickness of the at least one lens of the first lens unit is complementary or substantially complementary to the combined thickness of the at least one lens of the second lens unit and
      (2) adjustments of the relative positions of the two said lens units in a direction perpendicular or approximately perpendicular to the viewing direction results in changes in the combined focusing power of the two lens units, and
   B) a motor driven adjustment mechanism for moving at least one of the lens units relative to the other lens unit in a direction perpendicular or approximately perpendicular to the viewing direction, based on a measurements of the wearer's eye positions, so as to adjust the focusing power of the combined lens units;
(III) a frame in which said first and second lens systems are mounted.

6. A pair of eyeglasses comprising:
(I) a first adjustable focus lens system for adjusting focus in a viewing direction, said adjustable focus lens system comprising:
   A) a first lens unit and a second lens unit, each of said first and second lens units comprising at least one lens with each of the first and second lens units having at least one specially designed surface such that:
      (1) the combined thickness of the at least one lens of the first lens unit is complementary or substantially complementary to the combined thickness of the at least one lens of the second lens unit and
      (2) adjustments of the relative positions of the two said lens units in a direction perpendicular or approximately perpendicular to the viewing direction results in changes in the combined focusing power of the two lens units, and
   B) a motor driven adjustment mechanism for moving at least one of the lens units relative to the other lens unit in a direction perpendicular or approximately perpendicular to the viewing direction, based on special cues comprising blinking of a single eye, so as to adjust the focusing power of the combined lens units and (II) a second adjustable focus lens system comprising:
   A) a first lens unit and a second lens unit, each of said first and second lens units comprising at least one lens with each of the first and second lens units having at least one specially designed surface such that:
      (1) the combined thickness of the at least one lens of the first lens unit is complementary or substantially complementary to the combined thickness of the at least one lens of the second lens unit and
      (2) adjustments of the relative positions of the two said lens units in a direction perpendicular or approximately perpendicular to the viewing direction results in changes in the combined focusing power of the two lens units, and
   B) a motor driven adjustment mechanism for moving at least one of the lens units relative to the other lens unit in a direction perpendicular or approximately perpendicular to the viewing direction, based on special cues comprising blinking of a single eye, so as to adjust the focusing power of the combined lens units;
(III) a frame in which said first and second lens systems are mounted.

* * * * *